United States Patent
Chung et al.

(10) Patent No.: US 10,072,196 B2
(45) Date of Patent: Sep. 11, 2018

(54) METHOD OF PREPARING GRAPHENE-GRAPHENE FUSED MATERIAL AND METHOD OF PREPARING GRAPHENE-SUBSTRATE COMPOSITE USING THE SAME

(71) Applicant: AMOGREENTECH CO., LTD., Gimpo-si, Gyeonggi-do (KR)

(72) Inventors: Jae Woo Chung, Seoul (KR); Jung Hyun Kim, Seoul (KR)

(73) Assignee: AMOGREENTECH CO., LTD., Gimpo-si, Gyeonggi-do (KR)

( * ) Notice: Subject to any disclaimer, the term of this patent is extended or adjusted under 35 U.S.C. 154(b) by 87 days.

(21) Appl. No.: 15/166,899

(22) Filed: May 27, 2016

(65) Prior Publication Data
US 2016/0272865 A1    Sep. 22, 2016

Related U.S. Application Data

(63) Continuation-in-part of application No. 14/225,539, filed on Mar. 26, 2014, now abandoned.

(51) Int. Cl.
*C09K 5/14* (2006.01)
*B82Y 30/00* (2011.01)
(Continued)

(52) U.S. Cl.
CPC ............... *C09K 5/14* (2013.01); *B82B 1/00* (2013.01); *B82Y 30/00* (2013.01); *B82Y 40/00* (2013.01);
(Continued)

(58) Field of Classification Search
None
See application file for complete search history.

(56) References Cited

U.S. PATENT DOCUMENTS

2003/0098640 A1    5/2003  Kishi
2009/0110627 A1    4/2009  Choi
(Continued)

FOREIGN PATENT DOCUMENTS

KR    10-2011-0068647 A    6/2011
KR    10-2011-0121583 A    11/2011
(Continued)

OTHER PUBLICATIONS

English text translation of Choi et al. (KR 101330227 B1), accessed from the EPO website; PDF pp. 1-35 attached to the case file for reference.*

*Primary Examiner* — Katie L Hammer
(74) *Attorney, Agent, or Firm* — Paratus Law Group, PLLC

(57) ABSTRACT

Disclosed is a method of preparing a graphene-graphene fused material, including: forming a plurality of nano graphene-metal composites comprised of nano graphene and a nano metal provided on a surface of the nano graphene for bonding between the nano graphenes; forming a polydopamine layer on outer surfaces of the nano graphene-metal composites; and thermally treating the nano graphene-metal composites to prepare a graphene-graphene fused material in which the nano graphene-metal composites are melted and bonded to each other by the nano metal provided on the nano graphene-metal composites.

13 Claims, 9 Drawing Sheets

(51) Int. Cl.
    *B82Y 40/00*     (2011.01)
    *H01B 1/04*     (2006.01)
    *B82B 1/00*     (2006.01)
    *C01B 31/04*     (2006.01)
    *H01M 4/133*     (2010.01)
    *H01M 4/587*     (2010.01)

(52) U.S. Cl.
    CPC ........... *C01B 31/0484* (2013.01); *H01B 1/04* (2013.01); *H01M 4/133* (2013.01); *H01M 4/587* (2013.01); *Y10S 977/734* (2013.01); *Y10S 977/847* (2013.01)

(56) References Cited

U.S. PATENT DOCUMENTS

| | | |
|---|---|---|
| 2010/0323113 A1 | 12/2010 | Ramappa |
| 2011/0049437 A1 | 3/2011 | Crain |
| 2011/0200825 A1 | 8/2011 | Chakraborty et al. |
| 2011/0256014 A1 | 10/2011 | Hong et al. |
| 2012/0000845 A1 | 1/2012 | Park |
| 2012/0107590 A1 | 5/2012 | Xu |
| 2013/0065034 A1 | 3/2013 | Muramatsu |
| 2013/0081678 A1 | 4/2013 | Naito |
| 2013/0189580 A1 | 7/2013 | Dai et al. |
| 2015/0179294 A1 | 6/2015 | Kim |
| 2016/0318100 A1* | 11/2016 | Kim ...................... B22F 1/0018 |

FOREIGN PATENT DOCUMENTS

| | | | |
|---|---|---|---|
| KR | 101330227 B1 * | 11/2013 | |
| WO | WO 2015099415 A1 * | 7/2015 | ............ B22F 1/0018 |

* cited by examiner

METHOD OF PREPARING GRAPHENE-GRAPHENE FUSED MATERIAL AND METHOD OF PREPARING GRAPHENE-SUBSTRATE COMPOSITE USING THE SAME

CROSS-REFERENCE TO RELATED APPLICATION

This application is a continuation-in-part application of U.S. patent application Ser. No. 14/225,539 filed on Mar. 26, 2014, which is all hereby incorporated by reference in its entirety.

BACKGROUND

1. Field of the Invention

The present invention relates to a graphene-graphene fused material, and more particularly, to a method of preparing a graphene-graphene fused material and a method of preparing a graphene-substrate composite using the graphene-graphene fused material, which may embody a substrate having superior performances in thermal conductivity, electrical conductivity and mechanical strength by improving the connectivity and bonding strength between graphenes and dispersibility of a fused material in the substrate.

2. Discussion of Related Art

Graphene is a 2-dimensional nano sheet having a honeycomb lattice made of sp2-bonded carbon atoms, and has a high usability as a negative electrode active material of a lithium secondary battery and an electrode active material of an ultra-high capacity capacitor due to a high specific surface area and superior electrical conductivity and mechanical strength. FIG. 1 is a structural view illustrating a 2-D nanosheet of single layer graphene. As illustrated in FIG. 1, the graphene is made of a 2-dimensional single layer nanosheet. Such graphene has emerged as a future core material of the material industry.

For application of graphene to a large-sized graphene sheet, a preparation method using a chemical vapor deposition process has been proposed, but has a problem in that the large-sized graphene sheet may be formed only on a copper substrate, the manufacturing itself is difficult, or economic feasibility and productivity are poor.

Accordingly, a method of preparing graphene as powder and mixing the powder with a polymer substrate or the like to prepare a large-sized sheet has been proposed, but dispersibility is not good when graphene powder is mixed with the substrate, and thus graphene powder is dispersed in an agglomerated state. This problem is more frequently encountered in reduced graphene, particularly. When graphene oxide is used in order to prevent the problem, the selection of the type of graphene to be used is limited and thermal conductivity, electrical conductivity and the like are reduced due to the use of graphene oxide.

Further, a slight floating portion is present between the interface in which graphene and a substrate contact each other according to the type of the substrate, and thus electrical conductivity, thermal conductivity, gas barrier properties or the like are remarkably degraded due to decreased interfacial properties.

In order to address the issue, a method of providing various types of functional groups, such as —COOH, —COO−, —OH, —NH, or the like at corners of nano graphene according to the type of the substrate material as illustrated in FIG. 2 has been suggested. The process of providing functional groups at the corners of nano graphene is generally conducted in a liquid, such as an acid or alkali, but increases subsequent processes to deteriorate economic feasibility and productivity. Moreover, there is a limit on the improvement of dispersibility of graphene although functional groups are provided.

Meanwhile, a substrate material is still present in a space between graphene powders even when dispersibility of graphene is greatly improved, and when the substrate material has poor thermal and electrical properties as compared to graphene, the prepared sheet fails to achieve the desired level of thermal and electrical properties. Furthermore, when a separation distance between graphenes is reduced by greatly increasing the content of graphene powder in the sheet so as to resolve this problem, sheet formability is degraded, and mechanical strength of the sheet is decreased.

Therefore, research and development on the substrate which has enhanced performances in thermal conductivity and electrical conductivity by increasing connectivity, bonding strength and dispersibility of graphenes in the substrate is urgently needed.

SUMMARY OF THE INVENTION

The present invention is designed to solve the above-described problems, and thus an object of the present invention is to provide a graphene-graphene fused material and a method of preparing the same in which connectivity and bonding strength between graphenes are improved.

Further, another object of the present invention is to provide a graphene-graphene fused material and a method of preparing the same which may increase dispersibility of graphene in the substrate.

Moreover, still another object of the present invention is to provide a graphene-substrate composite and a method of preparing the same in which thermal conductivity and electrical conductivity are enhanced by improving connectivity, bonding strength and dispersibility of graphene in the substrate.

Furthermore, yet another object of the present invention is to provide a graphene-substrate composite and a method of preparing the same in which the degradation of mechanical strength is minimized in spite of the high content of the graphene-graphene fused material in the substrate.

To accomplish the above-mentioned technical object, the present invention provides a method of preparing a graphene-graphene fused material, including: (a) forming a plurality of nano graphene-metal composites comprised of nano graphene and a nano metal provided on a surface of the nano graphene for bonding between the nano graphenes; (b) forming a polydopamine layer on outer surfaces of the nano graphene-metal composites; and (c) thermally treating the nano graphene-metal composites to prepare a graphene-graphene fused material in which the nano graphene-metal composites are melted and bonded to each other by the nano metal provided on the nano graphene-metal composites.

According to an embodiment of the present invention, the nano graphene-metal composite may be formed by coating or attaching a nano metal particle on a surface of the nano graphene.

Further, the graphene-graphene fused material may be configured in the form of a single chain in which the plurality of nano graphene-metal composites are sequentially connected, or in the form of a composite chain in which the plurality of nano graphene-metal composites are irregularly connected.

Further, the thermal treating in step (c) may be conducted at a temperature higher than a melting point of the nano metal.

Further, the nano metal may be one or more of nickel, copper, gold, platinum and silver.

Further, the polydopamine layer may be provided on the nano metal of the nano graphene-metal composite.

Further, the polydopamine layer in step (b) may be included at 5 to 25 parts by weight based on 100 parts by weight of the nano graphene-metal composite in step (a).

Further, the nano metal in step (a) may have a diameter of 25 nm or more.

Further, the present invention provides a method of preparing a graphene-substrate composite, including: (a) forming a plurality of nano graphene-metal composites comprised of nano graphene and a nano metal provided on a surface of the nano graphene for bonding between the nano graphenes; (b) forming a polydopamine layer on outer surfaces of the nano graphene-metal composites; (c) thermally treating the nano graphene-metal composites to prepare a graphene-graphene fused material in which the nano graphene-metal composites are melted and bonded to each other by the nano metal provided on the nano graphene-metal composites; and (d) pulverizing the prepared graphene-graphene fused material and dispersing the pulverized graphene-graphene fused material in a substrate.

According to an embodiment of the present invention, the nano metal in step (a) may have a diameter of 25 nm or more.

Further, the present invention provides a graphene-graphene fused material, including: a plurality of nano graphenes; a nano metal provided on outer surfaces of the nano graphenes for melt bonding between the nano graphenes; and a polydopamine layer at least provided on an outer surface of the nano metal.

According to an embodiment of the present invention, the graphene-graphene fused material may be configured in the form of a single chain in which the plurality of nano graphene-metal composites are sequentially connected, or in the form of a composite chain in which the plurality of nano graphene-metal composites are irregularly connected.

Further, the graphene-graphene fused material may include the polydopamine layer at 5 to 25 parts by weight based on 100 parts by weight of a total weight of the nano graphene and the nano metal.

Further, the present invention provides a graphene-substrate composite, including: a substrate; and the graphene-graphene fused material according to the present invention dispersed in the substrate.

According to an embodiment of the present invention, the graphene-graphene fused material may be included at 60 wt % or more based on a total weight of the graphene-substrate composite.

BRIEF DESCRIPTION OF THE DRAWINGS

The above and other aspects will be more clearly understood from the following detailed description taken in conjunction with the accompanying drawings, in which:

FIG. 5 is a schematic view illustrating a bonded state of a graphene-graphene fused material.

FIG. 6 is a schematic view illustrating a structure of a graphene-graphene fused material according to an embodiment of the present invention.

FIG. 7 is a schematic view illustrating a graphene-substrate composite according to an embodiment of the present invention.

FIG. 9 shows X-ray diffraction (XRD) analysis results of exemplary nano graphene-metal composites used in a method of preparing a graphene-graphene fused material according to an embodiment of the present invention, in which nano graphene and nickel are successfully fused in a radio frequency (RF) plasma system.

DETAILED DESCRIPTION OF EXEMPLARY EMBODIMENTS

Figure 1:
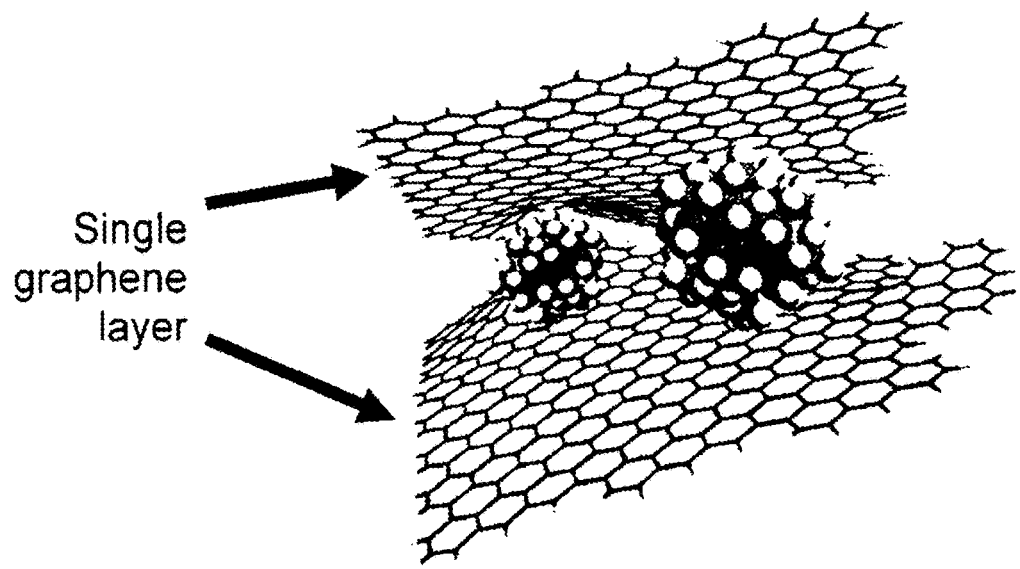
FIG. 1 is a structural view illustrating a 2-dimensional nanosheet made of a single graphene layer.
Figure 2:
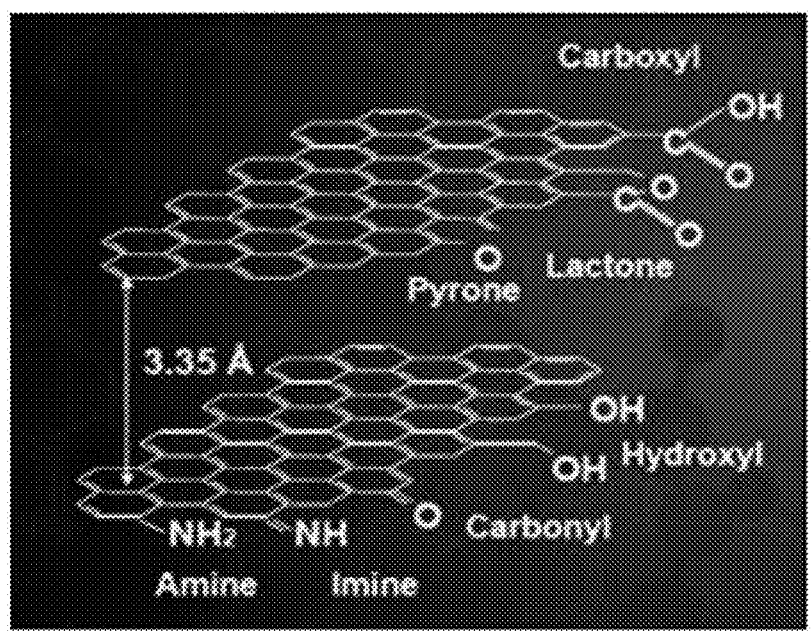
FIG. 2 is a schematic view illustrating that various types of functional groups, such as —COOH, —COO−, —OH, —NH, or the like are formed at corners of nano graphene.

Hereinafter, with reference to the accompanying drawings, embodiments of the present invention will be described in detail enough for those of ordinary skilled in the art to easily perform embodiments of the invention. The invention may, however, be embodied in many different forms and should not be construed as being limited to the embodiments set forth herein. In the following description of the present invention, a detailed description of known functions and configurations incorporated herein will be omitted to avoid making the subject matter of the present invention unclear and, in every possible case, like reference numerals are used for referring to the same or similar elements in the description and drawings.

Since a method of preparing a graphene-substrate composite according to an embodiment of the present invention is performed while including a method of preparing a graphene-graphene fused material according to the present invention, the description of the method of preparing a graphene-graphene fused material is substituted with that of the method of preparing a graphene-substrate composite.

Figure 3:
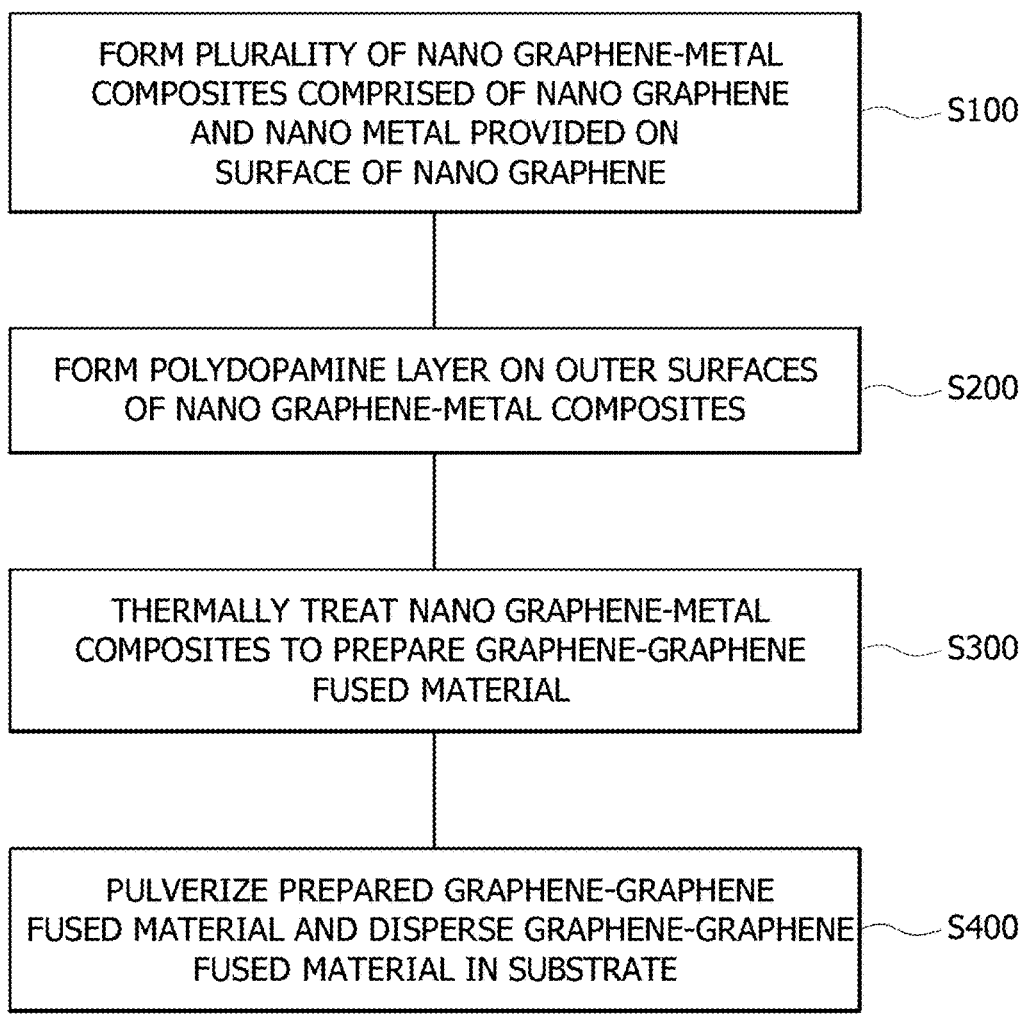
FIG. 3 is a flow diagram sequentially showing a method of preparing a graphene-substrate composite according to an embodiment of the present invention.

More specifically, as illustrated in FIG. 3, a graphene-substrate composite according to an embodiment of the present invention may be prepared by performing a method including: (a) forming nano graphene-metal composites comprised of nano-graphene and a nano metal (S100); (b)

forming a polydopamine layer on outer surfaces of the nano graphene-metal composites (S200); (c) thermally treating the nano graphene-metal composites to prepare a graphene-graphene fused material in which the nano graphene-metal composites are melted and bonded to each other by the nano metal provided in the nano graphene-metal composites (S300); and (d) pulverizing the prepared graphene-graphene fused material and dispersing the pulverized graphene-graphene fused material in a substrate (S400).

First, step (a) (S100) of the preparation method according to the present invention is a step of forming a nano graphene-metal composite having a nano metal provided on a surface of the nano graphene by coating or attaching nano metal particles on the surface of the nano graphene.

Figure 4:
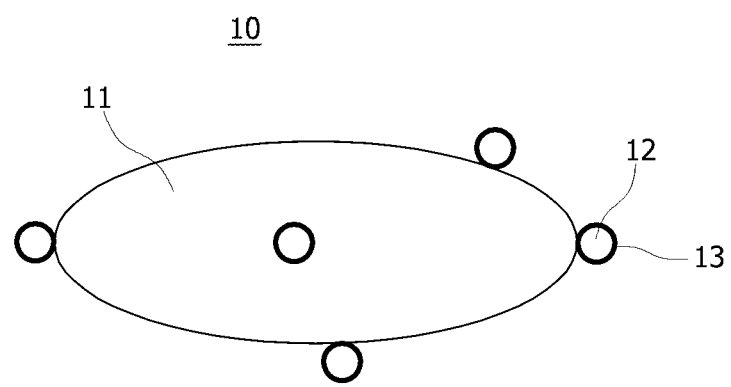
FIG. 4 is a schematic view illustrating a nano graphene-metal composite used in a method of preparing a graphene-graphene fused material according to an embodiment of the present invention.

As illustrated in FIG. 4, the method of coating or attaching the nano metal particles 12 on the surface of the nano graphene 11 to prepare the nano graphene-metal composite 10 may be conducted using a radio frequency (RF) plasma process or a wet process, and preferably may be conducted using the RF plasma process. This is because it is difficult to control the particle size, content and location of the nano metal provided on the surface of the nano graphene using the wet process instead of the RF plasma process. The nano metal having a desired diameter may be easily formed on the surface of the graphene using the RF plasma process. The nano metal is used as a bonding material for connecting the nano graphenes to each other as described below. When the particle size of the nano metal is unable to be controlled and is too small or when the content of the nano metal is unable to be controlled and is too low, the graphenes are difficult to bond to each other, and the graphene-graphene fused material may be easily separated although the graphenes are bonded. Further, when the particle size of the nano metal is unable to be controlled and is too large or when the content of the nano metal is unable to be controlled and is too high, the content of the nano metal in the graphene-graphene fused material may increase, making it difficult to achieve the desired properties due to the graphenes. Therefore, it is more preferable to prepare the nano graphene-metal composite using RF plasma.

Figure 8:
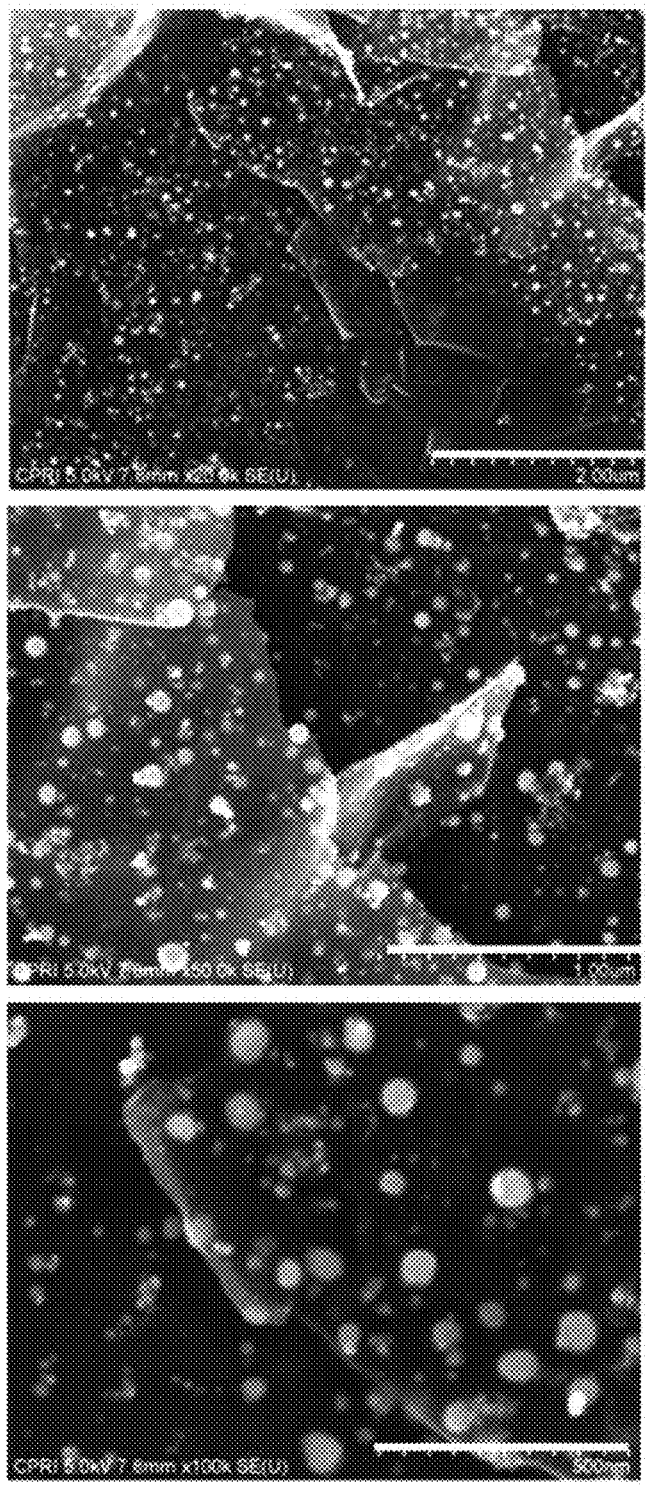
FIG. 8 is a scanning electron microscopic (SEM) photograph of a nano graphene-nickel fused material as an example of a nano graphene-metal composite used in a method of preparing a graphene-graphene fused material according to an embodiment of the present invention.
Figure 9A:
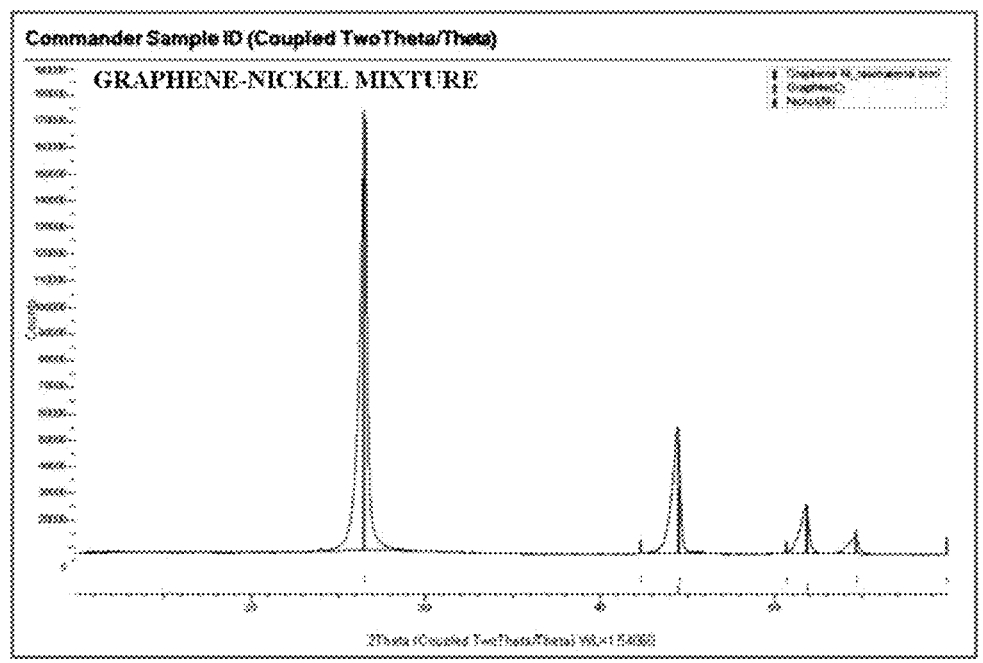
FIG. 9A shows an XRD analysis result (of nano graphene-nickel mixture) before an RF plasma treatment.
Figure 9B:
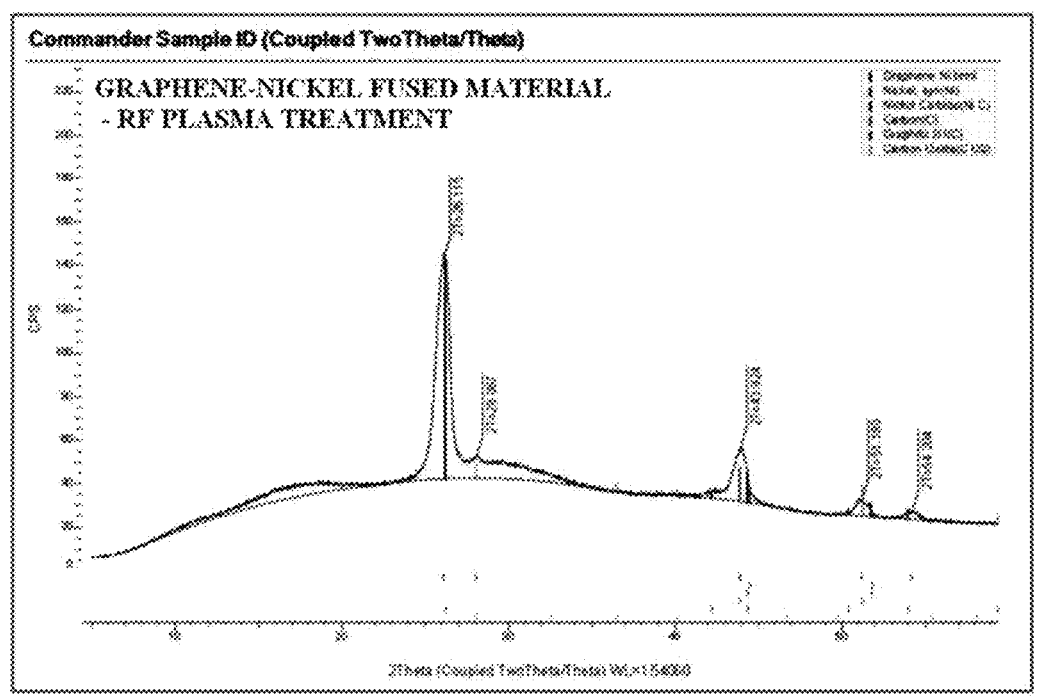
FIG. 9B shows an XRD result (of nano graphene-nickel fused material) after an RF plasma treatment.

Further, when the nano metal 12 is positioned on an outer surface of the nano graphene 11 by RF plasma, bonding strength of the nano metal 12 and the nano graphene 11 may be excellent, and the nano metal 12 and the nano graphene 11 may be bonded through chemical bonding. More specifically, referring to a nano graphene-nickel composite formed by RF plasma shown in a scanning electron microscopic (SEM) photograph of FIG. 8, it can be seen that nano nickel is well nucleated on the nano graphenes. Here, FIG. 9A shows an XRD analysis result of the nano graphene and nickel in a mixed state before an RF plasma treatment, and each material is not bonded and shows a peak at its own azimuth angle with respect to each material. On the other hand, a nano graphene-nickel composite prepared after an RF plasma treatment as illustrated in FIG. 9B shows a peak with respect to nickel carbide (NiC), from which it may be seen that the graphene and nickel is not only physically bonded but also chemically bonded to each other.

The nano graphene 11 may have a nano sized thickness, and micron sized length and width, and more specifically, the length may be in a range of 1 to 100 μm. Further, the nano graphene 11 may be a reduced graphene oxide in order to exhibit further enhanced performances in thermal conductivity, electrical conductivity and gas barrier properties.

Further, the nano metal 12 serves as a bonding material for bonding between the graphenes, and excellent electrical conductivity, thermal conductivity and gas barrier properties may be exhibited by connecting the graphenes through the nano metal, as compared to the case in which the graphenes are dispersed in the substrate while being spaced apart from each other. Further, the nano metal functions to enable smooth generation and provision of a polydopamine layer which will be described below.

Unless the nano metal 12 reduces the electrical conductivity, thermal conductivity or the like of the graphene, any type of metal material which has a melting point high enough to easily allow melt bonding of the graphenes and is not easily separated from the graphenes may be used without limitation. For example, the nano metal 12 may be one or more of nickel, copper, gold, platinum and silver. Further, the nano metal may be in granular form, and may have a typical shape such as a sphere or an atypical shape.

Here, when the nano metal 12 is in granular form, an average particle size may be 25 nm or more. The nano metal functions as a bonding material for connecting and bonding the graphenes in the present invention, and a function of bonding the graphenes may be insufficiently performed when the particle size of the nano metal is too small. Particularly, the prepared graphene-graphene fused material undergoes a pulverization process before being dispersed in the substrate, and the graphene-graphene fused material having a reduced bonding force between the graphenes may not exhibit desired physical properties when being dispersed in the substrate because the graphene-graphene fused material is separated into each of graphenes in the pulverization process. Accordingly, the nano metal provided on the surface of the nano graphene may have the average particle size of 25 nm or more, and when the average particle size is less than 25 nm, it is difficult to bond the graphenes to each other even when a thermal treatment is performed in step (b) which will be described below. Further, although the graphenes are bonded though the melted nano metal, there is a problem in that the graphene-graphene fused material may be easily separated. Moreover, a polydopamine layer which will be described below may be formed on the nano metal, but when the particle size of the nano metal is small, the formation of the polydopamine layer may be difficult, and a low content of the polydopamine layer may be formed, and thus dispersibility of the graphene-graphene fused material may be decreased and it becomes difficult to increase the content of the graphene-graphene fused material in the substrate. Meanwhile, the average particle size of the nano metal is preferably 100 nm or less. When the average particle size is more than 100 nm, the thermal treatment time in step (b) which will be described below may be prolonged, and the final content of the graphene in the substrate may decrease as the content of the nano metal in the graphene-graphene fused material increases. Further, since an excess amount of the polydopamine layer is formed on the outer surface of the nano metal particle, adhesiveness between the graphenes through melting of the nano metal may be deteriorated.

The nano graphene-metal composite 10 may include the nano metal 12 at 30 to 1500 parts by weight based on 100 parts by weight of the nano graphenes 11.

Next, in step (b) (S200) of the preparation method according to the present invention, a polydopamine layer is formed on an outer surface of the nano graphene-metal composite.

Any known method of forming the polydopamine layer on the outer surface of the nano graphene-metal composite prepared in step (b) may be used without limitation. For example, a method including dipping of the nano graphene-metal composite in a weakly basic dopamine solution (step (b-1)), and forming of a polydopamine coating layer by oxidation of the dopamine may be performed. Here, a basic Tris buffer solution (100 mM) having a pH range of 8 to 14 may be used as the weakly basic dopamine solution. Further, the dipping may be carried out using a dip-coating method. Moreover, the oxidation process of the dopamine may be conducted by oxygen in the air without adding any other oxidizers, or may be conducted by adding an oxidizer such as ammonium persulfate.

Further, in step (b), the polydopamine layer may be formed using a dry plasma polymerization method, and in this case, a process may be carried out under conditions of RF power at a frequency of 0 to 200 W and a pressure of $1\times10^{-3}$ to $5\times10^{-1}$ Torr. At this time, it is preferable to use argon gas as a carrier gas; and one or more types of gases selected from the group consisting of hydrogen, nitrogen, oxygen, water vapor, ammonia and mixtures thereof as an active gas, and it is most preferable to use oxygen or ammonia.

The polydopamine layer formed using the above-described method may resolve the problem of the graphene-graphene fused materials not being distributed well in a polymer substrate or the like, and has an advantage of improving bonding properties between the graphenes as well as increasing bonding strength between the graphenes, and increasing the content of graphene-graphene fused material in the substrate.

As illustrated in FIG. 4, the polydopamine layer 13 may be provided on the nano metal 12 of the nano graphene-metal composite 10. In the case of graphene 11, although a process of forming the polydopamine layer on the outer surface of the graphene 11 is performed, the polydopamine layer is hardly formed due to poor compatibility of the graphene and dopamine and/or polydopamine. Particularly, this problem is more frequently encountered in a reduced graphene oxide as compared to an oxidized graphene oxide. Therefore, even when it is tried to form the polydopamine layer on the outer surface of the graphene so as to increase dispersibility of the reduced graphene oxide having particularly poor dispersibility, almost no polydopamine layer is formed on the outer surface of the final graphene.

In order to address this problem, the polydopamine layer is formed on the surface of the nano metal serving as a contact point and a bonding material between the graphenes, and thereby dispersibility of the graphene-graphene fused material, and bonding properties and bonding strength between the graphenes of the graphene-graphene fused material may be greatly improved in the present invention The polydopamine layer 13 may be included at 5 to 25 parts by weight based on 100 parts by weight of the total weight of the nano graphene 11 and the nano metal 12 in the nano graphene-metal fused material 10 in step (a). When the polydopamine layer is included at less than 5 parts by weight, it is hard to realize the improvement in physical properties by the polydopamine layer. Further, when the polydopamine layer is included at more than 25 parts by weight, the polydopamine layer disturbs thermal fusion bonding between the graphenes by the nano metal and generation of the graphene-graphene fused material is difficult, mechanical strength may be low even when the graphene-graphene fused material is generated, the graphenes may be separated and fallen away from the fused material in a pulverization process which will be described below, and in this case, it is unable to exhibit desired physical properties through the graphene-graphene fused material.

Next, as step (c) of the preparation method according to the present invention, the nano graphene-metal composites 10 on which the polydopamine layer 13 is formed are thermally treated to prepare a graphene-graphene fused material in which the nano graphene-metal composites 10 are melted and bonded to each other by the nano metal 12 provided on the nano graphene-metal composites 10 (S300). The thermal treatment may be conducted at a temperature higher than a melting point of the nano metal, or may be conducted at a temperature slightly lower than a melting point of the nano metal while applying pressure. Here, the applied temperature, pressure and the like may be changed depending on the material and particle size of the selected nano metal, and thus are not particularly limited in the present invention.

Figure 5A:
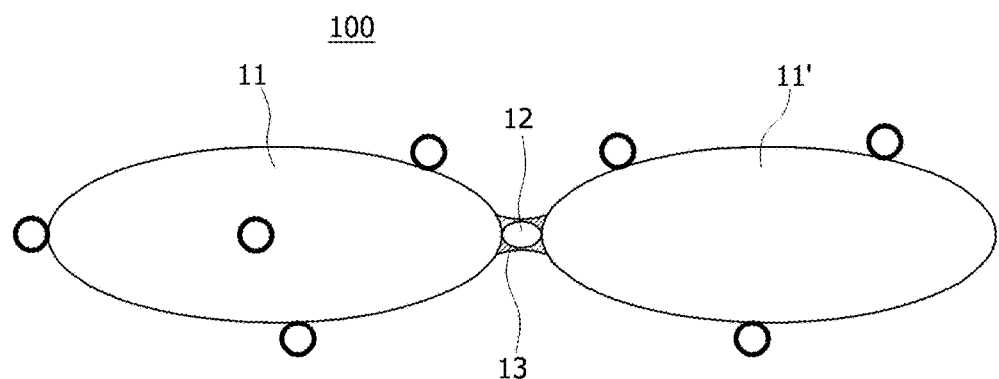
FIG. 5A is a view illustrating a graphene-graphene fused material bonded in a longitudinal direction of the graphene.
Figure 5B:
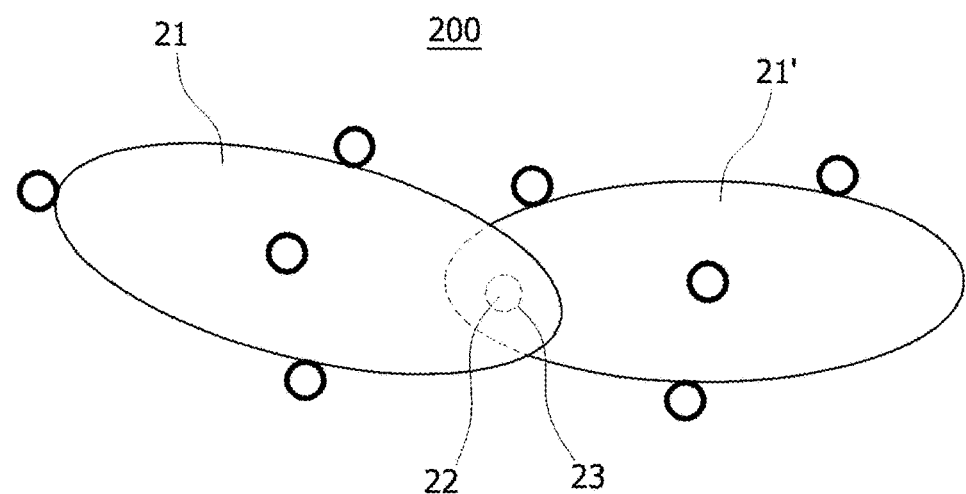
FIG. 5B is a view illustrating a graphene-graphene fused material bonded in a vertical direction of the graphene.

As illustrated in FIGS. 5A and 5B, the graphene-graphene fused materials 100 and 200 prepared by step (c) respectively include: two nano graphenes 11, 11' and 21, 21'; nano metal 12 and 22 provided on outer surfaces of the nano graphenes 11, 11' and 21, 21' for melt bonding between the nano graphenes 11, 11' and 21, 21'; and polydopamine layers 13 and 23 at least provided on outer surfaces of the nano metal 12 and 22.

Figure 6A:
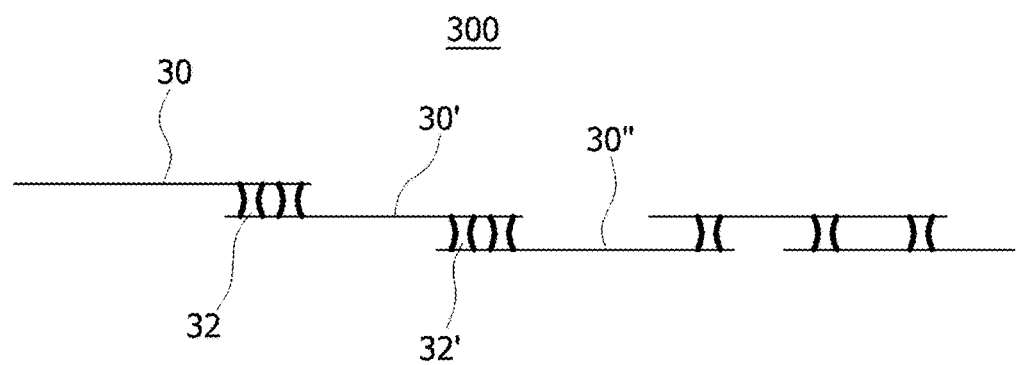
FIG. 6A illustrates a nano graphene-graphene fused material in the form of a single chain.
Figure 6B:
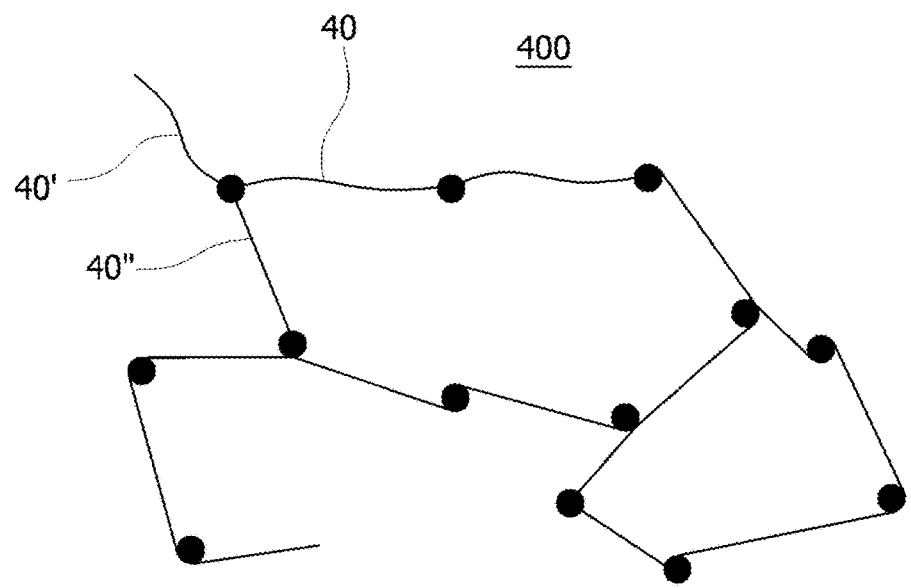
FIG. 6B illustrates a nano graphene-graphene fused material in the form of a composite chain.

Further, when a plurality of the nano graphene-metal composites are thermally bonded, a plurality of nano graphene-metal fused materials 30, 30' and 30" may be connected in the form of a single long chain by melt bonding as illustrated in FIG. 6A, or may be in the form of a composite chain in which a plurality of the single chains are irregularly connected again as illustrated in FIG. 6B. Here, nano metal 32 and 32' between the nano graphene-metal composites 30, 30' and 30" may be melted and bonded by heating the nano graphene-metal composites 30, 30' and 30" at a temperature higher than melting points of nano metal 32 and 32' by RF heating or blown hot air.

At this time, when pressure is applied to the nano graphene-metal composites 30, 30' and 30" while the thermal treatment is performed thereon, a plurality of nano graphene-metal composites may be connected in a form of a single long chain by melt bonding. When the hot air is blown onto the nano graphene-metal composites 30, 30' and 30" without applying pressure, a plurality of nano graphene-metal composites may be connected in a form of an irregular composite chain by melt bonding.

Next, as (d) step of the preparation method according to the present invention, the prepared graphene-graphene fused material is pulverized and then dispersed in the substrate (S400).

The pulverization may be performed using a known pulverization method, and for example, may be performed by a ball milling process. The material of the ball mill, and the milling speed and time may be changed according to purpose, and thus are not particularly limited in the present invention. An average particle size of the pulverized graphene-graphene fused material may be 50 μm or more, and preferably, 50 to 300 μm. The pulverized graphene-graphene fused material may structurally have a form of a single body or composite before pulverization, and when the average particle size is less than 50 μm, the connection structure of the graphenes before pulverization disappears and the graphenes are separated or particles which are only formed of the graphene and separated and fallen away from the fused material increase, and thus the effect of increasing physical properties according to the connection structure of the graphenes may be insufficient. Further, when the particle size is more than 300 μm after pulverization, dispersibility is deteriorated even though a polydopamine coating layer is present, and thus there is a problem in that the pulverized graphene-graphene fused materials are present in an agglomerated state.

Thereafter, the pulverized graphene-graphene fused materials are dispersed in the substrate and cured to form the graphene-substrate composite. The substrate may be formed of one or more of a polymer, an organic material, a metal and an inorganic material. For example, when the substrate is a polymer such as polyethylene terephthalate (PET), polyethylene naphthalate (PEN), polycarbonate (PC), polyether sulfone (PES), polyimide (PI) or the like, the graphene-substrate composite having superior performances in electrical conductivity, thermal conductivity and the like may be realized by dispersing graphene-graphene fused material powder.

Here, the substrate may be a solution or a melt in a liquid state. When the graphene-graphene fused material powder is put into the substrate in a liquid state, and is cured after mixing with the substrate, a graphene-substrate composite in which the graphene-graphene fused material powder is dispersed in the substrate may be formed.

Figure 7A:
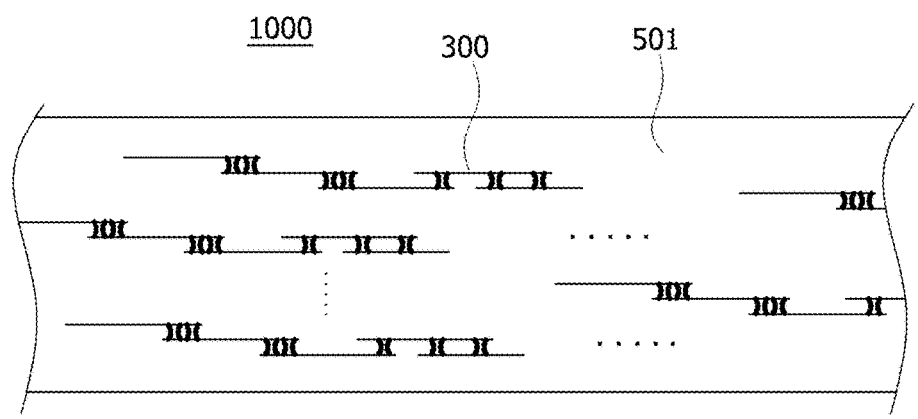
FIG. 7A illustrates that a graphene-graphene fused material in the form of a single chain is dispersed in a polymer substrate.
Figure 7B:
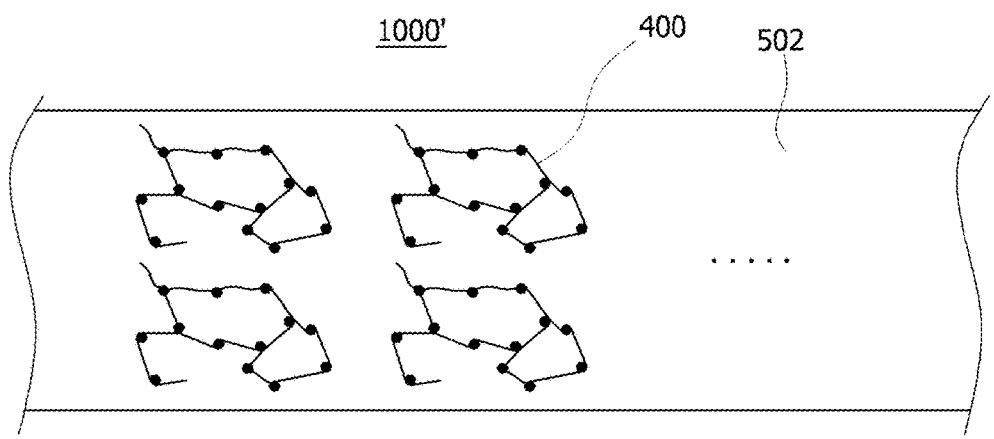
FIG. 7B illustrates that a graphene-graphene fused material in the form of a composite chain is dispersed in a polymer substrate.

As illustrated in FIG. 7A, the prepared graphene-substrate composite 1000 may have a form in which graphene-graphene fused materials 300 in a form of a single chain are dispersed in the substrate 501. Further, the graphene-substrate composite 1000' prepared as shown in FIG. 7B may have a form in which graphene-graphene fused materials 400 in a form of a composite chain are dispersed in the substrate 502. Since the graphene-graphene fused materials dispersed in the substrate are connected in the form of a single chain or composite chain, the graphene-graphene fused materials may have excellent electrical conductivity and thermal conductivity, and function as a good gas barrier.

The above-described graphene-substrate composites 1000 and 1000' may respectively include the graphene-graphene fused materials 300 and 400 at 60 wt % or more. This shows a significantly improved result as compared to an existing graphene-substrate composite prepared by dispersing graphenes in a substrate. It can be interpreted that a polydopamine layer provided on a graphene-graphene fused material prepared by the method according to the present invention improves interfacial properties with the substrate and dispersibility of the graphene-graphene fused material is increased.

A better understanding of the present invention may be obtained via the following examples which are set forth to illustrate, but are not to be construed as limiting the present invention.

Example 1

300 parts by weight of nickel powder (Nickel Ultrafine powder, Avention. Co., Ltd.) having a particle size of 1 to 3 μm was mixed based on 100 parts by weight of graphene powder (Graphene Nanoplatelets, Avention. Co., Ltd.) having a particle size of 1 to 20 μm and a thickness of 5 to 25 nm to prepare a raw material powder. Then, 10 slpm and 50 slpm of argon gas were respectively injected as a central gas and a sheath gas into a high-frequency thermal plasma apparatus. Thereafter, a voltage of 12 kW was applied to a plasma torch power supply to produce high-temperature thermal plasma, and then the degree of vacuum in the apparatus was maintained at 500 Torr before injection of the raw material powder, the raw material powder was injected into a high-frequency thermal plasma reaction unit through an injection nozzle of a plasma producing electrode unit at an injection rate of 10 mg/min, only nano nickel powder was crystallized into nanopowder after going through a selective vaporization process and bonded to graphene, and thereby a nano graphene-nickel composite was prepared. Such prepared nano graphene-nickel composite powder is separated from a cyclone unit, and adsorbed onto a filter of a collector through a conveying pipe. Subsequently, the powder adsorbed onto the filter was collected in a collection unit while undergoing a blowback process.

Then, dopamine having a concentration of 10 mM was dissolved in a Tris buffer solution (TBS, 100 mM) in order to form a polydopamine layer on the collected nano graphene-nickel composite, 5 g of the nano graphene-nickel composite was mixed in 1 L of the solution, and stirred for 2 hours under room temperature and atmospheric condition. 10 wt % of a conventional oxidizing agent based on the content of the dopamine was added and stirred to oxidize the dopamine. After stirring for 1 hour, any unreacted material was removed by filtering, and the remainder was washed with distilled water two times and dried at room temperature to prepare a nano graphene-nickel composite coated with polydopamine.

The nano graphene-nickel composite coated with the polydopamine was thermally treated at 1500° C. to melt the nano nickel, and thermal bonding between the graphenes was induced to prepare a graphene-graphene fused material. Thereafter, the prepared graphene-graphene fused material was pulverized by a ball mill to have an average particle size of 55 μm, 160 parts by weight of the pulverized graphene-graphene fused material was kneaded in 100 parts by weight of PET melted at 290° C. and extruded to prepare a graphene-PET composite in a sheet form having a thickness of 0.3 mm as shown in the following Table 1.

Examples 2 to 3

A graphene-PET composite as shown in the following Table 1 was prepared in the same manner as in Example 1 except that respective injection rates of a raw material powder were changed to 8 mg/min and 25 mg/min to prepare a nano graphene-nickel composite.

Examples 4 to 7

A graphene-PET composite as shown in the following Table 1 was prepared in the same manner as in Example 1 except that respective dopamine treatment times were changed to 10 minutes, 20 minutes, 30 minutes and 2 hours instead of 1 hour to prepare a nano graphene-nickel composite coated with a polydopamine layer.

Example 8

A graphene-PET composite as shown in the following Table 1 was prepared in the same manner as in Example 1 except that a ball-milling time was changed such that a graphene-graphene fused material has an average particle size of 45 μm, and thereby a graphene-graphene fused material powder was prepared.

Comparative Example 1

A graphene-PET composite as shown in the following Table 1 was prepared in the same manner as in Example 1 except that a nano graphene-nickel composite was thermally treated without forming a polydopamine layer to prepare a graphene-graphene fused material.

Comparative Example 2

A graphene-PET composite in a sheet form having a thickness of 0.3 mm as shown in the following Table 1 was prepared in the same manner as in Comparative Example 1 except that 120 parts by weight of the pulverized graphene-graphene fused material was kneaded in 100 parts by weight of PET melted at 290° C. and extruded.

Comparative Example 3

A graphene-PET composite as shown in the following Table 1 was prepared in the same manner as in Example 1 except that a process of forming nano nickel crystals on graphene was omitted and the graphene itself was introduced into a process of forming a polydopamine layer.

Experimental Example 1

A scanning electron microscope (SEM) image of the nano graphene-nickel composite which is an intermediate material in the preparation process of the examples and comparative examples was taken, and a particle size of a nickel particle was measured from the composite in the image. The result is shown in the following Table 1.

Experimental Example 2

In order to measure the content of a polydopamine layer from the nano graphene-nickel composite coated with the polydopamine layer which is an intermediate material in the preparation process of the examples and comparative examples, the weight of the nano graphene-nickel composite before and after formation of the polydopamine layer was measured, the weight of the polydopamine layer was calculated and converted into a relative weight with respect to 100 parts by weight of the nano graphene-nickel composite before formation of the polydopamine layer. The result is shown in the following Table 1.

Experimental Example 3

In order to measure the average particle size of the pulverized graphene-graphene fused material which is an intermediate material in the preparation process of the examples and comparative examples, the particle size of the pulverized powder was analyzed using a laser diffraction grain size analyzer. The result is shown in the following Table 1.

Experimental Example 4

The following physical properties of the graphene-PET composite prepared according to the examples and comparative examples were evaluated, and the result is shown in the following Table 1.

1. Injection Moldability

The injection moldability of the prepared graphene-PET composite was evaluated. The case in which a problem such as severing of a sheet or the like did not occur while a sheet having a length of 2 m was extruded was represented by ○, and the case in which an injection molding process was stopped due to severing of a sheet or the like was represented by x.

2. Evaluation of Flexural Strength

The prepared sheet was cut to a size including a 10 cm length and a 10 cm width, both sides of the sheet were hand-held, and the sheet was bent and unfolded such that an upper side and a lower side of the cut sheet contacted each other, bending and unfolding of the sheet was repeated 100 times, and the surface of the sheet was observed with the naked eye.

As a result of observation, the case in which a problem such as a graphene-graphene composite protruding on the surface of the sheet or a cracked surface of the sheet was not observed was represented by ○, and the case in which a problem was observed was represented by x.

3. Evaluation of Thermal Conductivity

The thermal conductivity was measured by a flash method using LFA manufactured by Netzsch Corporation. On the basis of 100% of the thermal conductivity of Comparative Example 1, the thermal conductivity measured in the examples and the other comparative examples was relatively calculated.

TABLE 1

|  |  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| Graphene/ nickel composite | Average particle size of nickel (nm) | 29 | 22 | 116 | 29 | 29 | 29 | 29 | 29 | 29 | 29 | 0 |
|  | Content of polydopamine (parts by weight) | 23 | 18 | 38 | 3 | 7 | 10 | 28 | 20 | 0 | 0 | 2 |
| Graphene/ graphene fused material | Average particle size (μm) | 60 | 43 | 47 | 51 | 58 | 60 | 53 | 45 | 52 | 52 | 13 |
| Graphene-PET composite | Content of graphene-graphene fused material (wt %) | 61.5 | 61.5 | 61.5 | 61.5 | 61.5 | 61.5 | 61.5 | 61.5 | 61.5 | 54.5 | 61.5 |
|  | Injection moldability | ○ | ○ | ○ | ○ | ○ | ○ | ○ | ○ | x | ○ | x |
|  | Flexural strength | ○ | ○ | ○ | x | ○ | ○ | ○ | ○ | x | x | x |

TABLE 1-continued

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Thermal conductivity (%) | 122 | 92 | 94 | 101 | 119 | 122 | 101 | 110 | 100 | 87 | 78 |

In the case of Example 2 in which the nickel particles formed on the outer surface of graphene have the average particle size of less than 25 nm, although the time for forming polydopamine is the same as that in Example 1, the content of the polydopamine decreased, and thus it can be determined that a polydopamine layer is formed on the surfaces of the nickel particles. Meanwhile, in the case of Example 2, although ball milling was performed under the same conditions as in Example 1, the average particle size of the graphene-graphene composite was 46 nm, which is significantly decreased as compared to Example 1. It can be evaluated that since the average particle size of nickel serving as a bonding material is small, separation between the graphenes in the graphene-graphene fused material and splitting of the separated graphene become severe. Furthermore, this interpretation can be determined through the evaluation of thermal conductivity, that is, it can be determined that thermal conductivity was significantly decreased as compared to Example 1.

Further, in the case of Example 3 in which the nickel particle formed on the outer surface of graphene has the average particle size of more than 100 nm, it can be determined that the content of the coated polydopamine layer is largely increased as compared to Example 1, and this is because the diameter of nickel on which the polydopamine layer may be formed is increased. Meanwhile, it can be expected that a large diameter of the nickel particle is advantageous in melt bonding, but bonding between the graphenes is deteriorated due to formation of an excess amount of the polydopamine layer, and thus it can be determined that the average particle size was notably decreased when a ball-milling process was carried out under the same conditions as in Example 1. This result can confirm that a decreased bonding force of the graphene-graphene fused material led to an accompanying reduction in thermal conductivity of the graphene-PET composite.

Meanwhile, Examples 4 to 7 show that the graphene-nickel composite includes a different content of the polydopamine layer according to the change in the time for forming the polydopamine layer. In the case of Example 4 in which polydopamine is included at less than 5 parts by weight based on 100 parts by weight of the nano graphene-nickel composite while the average particle size of the nickel particle as a bonding material is suitable, even though ball milling was performed under the same conditions as in Example 1, the particle size of the prepared graphene-graphene fused material powder was remarkably decreased as compared to Example 1, Example 5 and Example 6, and thus it can be determined that the bonding force of the graphene-graphene fused material is deteriorated.

Further, in the case of Example 7 in which polydopamine is included at more than 25 parts by weight based on 100 parts by weight of the nano graphene-nickel composite, although ball milling was performed under the same conditions, the particle size of the prepared graphene-graphene fused material powder was decreased as compared to Example 1, Example 5 and Example 6, and thus it can be ascertained that the bonding force of the graphene-graphene fused material is reduced.

Further, Example 8 is the case in which the graphene-graphene fused material is pulverized to have an average particle size of less than 50 µm. The excess pulverization may make it difficult for the graphene-graphene fused material to maintain the structure of a single chain or a composite chain, and thus it can be determined that thermal conductivity is markedly decreased as compared to Example 1.

Meanwhile, in the case of Comparative Examples 1 and 2 in which no polydopamine layer is formed, it is ascertained that injection moldability is poor. Particularly, in the case of Comparative Example 2, there is no problem in injection moldability since the content of graphene-graphene fused material in the graphene-PET composite is 54.5 wt %, but in the case of Comparative Example 1, the content of graphene-graphene fused material in the graphene-PET composite is 61.5 wt %, and thus there is a problem of injection moldability. From this fact, it can be found that it is difficult to increase the content of the graphene-graphene fused material in the substrate to 60 wt % or more in the absence of the polydopamine layer.

According to the present invention, the graphene-graphene fused material has connectivity and bonding strength between the graphenes, dispersibility of the graphenes in the substrate, which are improved by a simple process, and thus is suitable to realize a graphene-substrate composite having superior performances in electrical conductivity, thermal conductivity, gas barrier properties, etc. Further, a graphene-substrate composite, in which injection moldability is improved and the degradation of mechanical strength is minimized in spite of the high content of the graphene-graphene fused material in the substrate, may be realized, and thus can be used in a wide range of applications including a material of a flexible substrate, an electrode material of lithium secondary battery and ultra-high capacity capacitor, etc.

Although the detailed description has been disclosed for illustrative purposes, those skilled in the art will appreciate that various modifications, additions and substitutions are possible, without departing from the scope and spirit of the inventive concept as disclosed in the accompanying claims.

What is claimed is:

1. A method of preparing a graphene-graphene fused material, comprising:
   (a) forming a plurality of nano graphene-metal composites comprised of nano graphene and a nano metal provided on a surface of the nano graphene for bonding between the nano graphenes;
   (b) forming a polydopamine layer on outer surfaces of the nano graphene-metal composites; and
   (c) thermally treating the nano graphene-metal composites to prepare a graphene-graphene fused material in which the nano graphene-metal composites are melted and bonded to each other by the nano metal provided on the nano graphene-metal composites, wherein the graphene-graphene fused material is configured in the form of a single chain in which the plurality of nano graphene-metal composites are sequentially connected, or in the form of a composite chain in which the plurality of nano graphene-metal composites are irregularly connected.

2. The method of claim 1, wherein the nano graphene-metal composite is formed by coating or attaching a nano metal particle on a surface of the nano graphene.

3. The method of claim 1, wherein the thermal treating in step (c) is conducted at a temperature higher than a melting point of the nano metal.

4. The method of claim 1, wherein the nano metal is one or more of nickel, copper, gold, platinum and silver.

5. The method of claim 1, wherein the polydopamine layer is provided on the nano metal of the nano graphene-metal composite.

6. The method of claim 1, wherein the polydopamine layer in step (b) is included at 5 to 25 parts by weight based on 100 parts by weight of the nano graphene-metal composite in step (a).

7. The method of claim 1, wherein the nano metal in step (a) has a diameter of 25 nm or more.

8. A method of preparing a graphene-substrate composite, comprising:
(a) forming a plurality of nano graphene-metal composites comprised of nano graphene and a nano metal provided on a surface of the nano graphene for bonding between the nano graphenes;
(b) forming a polydopamine layer on outer surfaces of the nano graphene-metal composites;
(c) thermally treating the nano graphene-metal composites to prepare a graphene-graphene fused material in which the nano graphene-metal composites are melted and bonded to each other by the nano metal provided on the nano graphene-metal composites; and
(d) pulverizing the prepared graphene-graphene fused material and dispersing the pulverized graphene-graphene fused material in a substrate,
wherein the graphene-graphene fused material is configured in the form of a single chain in which the plurality of nano graphene-metal composites are sequentially connected, or in the form of a composite chain in which the plurality of nano graphene-metal composites are irregularly connected.

9. The method of claim 8, wherein the nano metal in step (a) has a diameter of 25 nm or more.

10. A graphene-graphene fused material, comprising:
a plurality of nano graphene-metal composites comprised of nano graphene, a nano metal provided on a surface of the nano graphenes for bonding between the nano graphenes, and a polydopamine layer at least provided on an outer surface of the nano metal,
wherein a nano graphene of one nano graphene-metal composite is connected to a nano graphene of an adjacent nano graphene-metal composite by a melting bonding of the nano metal, and
wherein the graphene-graphene fused material is configured in the form of a single chain in which the plurality of nano graphene-metal composites are sequentially connected, or in the form of a composite chain in which the plurality of nano graphene-metal composites are irregularly connected.

11. The graphene-graphene fused material of claim 10, wherein the graphene-graphene fused material includes the polydopamine layer at 5 to 25 parts by weight based on 100 parts by weight of a total weight of the nano graphene and the nano metal.

12. A graphene-substrate composite, comprising:
a substrate; and
the graphene-graphene fused material according to claim 10 dispersed in the substrate.

13. The graphene-substrate composite of claim 12, wherein the graphene-graphene fused material is included at 60 wt % or more based on a total weight of the graphene-substrate composite.

* * * * *